US012711125B1

(12) United States Patent
Razoumov et al.

(10) Patent No.: US 12,711,125 B1
(45) Date of Patent: Aug. 18, 2026

(54) NUMERICALLY ACCURATE GENERATIVE MACHINE LEARNING SYSTEM

(71) Applicant: Amazon Technologies, Inc., Seattle, WA (US)

(72) Inventors: Leonid Razoumov, Bronx, NY (US); Rahul Chinthala, Seattle, WA (US); Dela K Agbemabiese, Edmonds, WA (US); Du Zhang, Newark, DE (US); Liam Greenamyre, Atlanta, GA (US); Tina Yun, Brooklyn, NY (US); Ejup Hoxha, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/961,278

(22) Filed: Nov. 26, 2024

(51) Int. Cl.

| | |
|---|---|
| ***G06F 16/00*** | (2019.01) |
| ***G06F 9/54*** | (2006.01) |
| ***G06F 16/23*** | (2019.01) |
| ***G06F 16/25*** | (2019.01) |

(52) U.S. Cl.
CPC .......... *G06F 16/2365* (2019.01); *G06F 9/541* (2013.01); *G06F 16/258* (2019.01)

(58) Field of Classification Search
None
See application file for complete search history.

(56) References Cited

U.S. PATENT DOCUMENTS

| | | | |
|---|---|---|---|
| 10,409,898 B2 | 9/2019 | Sharma et al. | |
| 10,474,709 B2 | 11/2019 | Paulus | |
| 10,614,106 B2 | 4/2020 | Kelsey et al. | |
| 10,630,840 B1 * | 4/2020 | Karp | G06N 5/04 |

(Continued)

FOREIGN PATENT DOCUMENTS

| | | | |
|---|---|---|---|
| WO | WO-2024130215 A1 * | 6/2024 | G06N 3/0475 |

OTHER PUBLICATIONS

Large Language Models for Mathematical Reasoning: Progresses and Challenges, Janice et al., (Year: 2024).*

(Continued)

*Primary Examiner* — Jean M Corrielus
(74) *Attorney, Agent, or Firm* — Alexander A. Knapp; Kowert, Hood, Munyon, Rankin & Goetzel, P.C.

(57) ABSTRACT

A generative machine learning system receives a query including a portion requiring mathematical operations to be performed using data from a data source, wherein the data source comprises numerical data. The generative machine learning system uses a generative machine learning model to generate instructions for a deterministic computational engine to perform a deterministic query. The generative machine learning system verifies the correctness of the instructions for the deterministic computational engine based on an expected structure for the mathematical operations used in the deterministic query. The generative machine learning system receives a result of the deterministic query from the deterministic computational engine to generate the answer for the query. The generative machine learning system verifies that the portion of the answer related to the portion of the query requiring mathematical operations is numerically consistent with the corresponding portions of the result of the deterministic query.

20 Claims, 9 Drawing Sheets

(56) References Cited

U.S. PATENT DOCUMENTS 10,685,050 B2 6/2020 Krishna et al.
10,909,157 B2 2/2021 Paulus et al.
10,929,392 B1 2/2021 Cheng
11,017,156 B2 5/2021 Hwang
11,455,543 B2 9/2022 D'souza et al.
11,557,276 B2 1/2023 Bender et al.
11,561,940 B2 * 1/2023 Doan Huu ............ G06F 16/284
11,726,999 B1 * 8/2023 Vig ....................... G06F 16/258 707/718
12,001,462 B1 6/2024 Madisetti et al.
2008/0134158 A1 * 6/2008 Salz .......................... G06F 8/34 717/148
2009/0210383 A1 * 8/2009 Seemann ............ G06F 16/8365 707/E17.127
2010/0262973 A1 * 10/2010 Ernst ......................... G06F 9/54 718/104
2011/0258240 A1 * 10/2011 LeFever .................. G06F 16/30 707/812
2012/0078891 A1 * 3/2012 Brown ................ G06F 16/3329 707/723
2013/0325439 A1 * 12/2013 Fink ...................... G06F 40/268 704/9
2013/0339982 A1 * 12/2013 Ernst ......................... G06F 9/54 719/313
2016/0132589 A1 * 5/2016 Nolan ................... G06F 16/335 707/728
2018/0150454 A1 * 5/2018 Sharma ................. G06F 16/353
2020/0007556 A1 * 1/2020 Brebner ................ G06F 16/958
2020/0374394 A1 * 11/2020 Karp ................... H04L 63/0807
2021/0134173 A1 5/2021 Yuan et al.
2021/0150270 A1 * 5/2021 Agarwalla ............. G06N 20/00
2021/0297531 A1 * 9/2021 Karp ....................... G06F 9/547
2023/0334046 A1 * 10/2023 Vig ........................ G06N 5/046
2023/0342348 A1 * 10/2023 Wang .................. G06F 16/2246
2023/0351176 A1 * 11/2023 Darmour .................. G06N 3/08
2023/0376365 A1 * 11/2023 Linquist .................. G06F 9/542
2024/0037114 A1 * 2/2024 Peignier ................ G06F 16/252
2024/0095077 A1 3/2024 Singh et al.
2024/0111498 A1 4/2024 Vaughn
2024/0202221 A1 * 6/2024 Siebel .................. G06N 3/0475
2024/0248765 A1 * 7/2024 Scanlan ................ G06F 9/5038
2024/0362257 A1 * 10/2024 Nageshwar ........... G06F 16/243
2024/0394600 A1 * 11/2024 Cunningham .......... G06F 40/30
2025/0045129 A1 * 2/2025 Upadhyay ............... G06F 9/541
2025/0110943 A1 * 4/2025 Miller .................... G06N 3/045
2025/0165775 A1 * 5/2025 Sathianathan ............ G06F 8/76
2025/0321976 A1 * 10/2025 Isles ...................... G06F 16/258

OTHER PUBLICATIONS

Google DeepMind, "Teaching language models to support answers with verifiedquotes", Mar. 16, 2022, pp. 1-40.
Pei Zhouo, et al., "Think Before You Speak: Explicitly Generating Implicit Commonsense Knowledge for ResponseGeneration," https://arxiv.org/abs/2110.08501, Jun. 7, 2022, pp. 1-17.
"Yi Tay, et al.., ""Transformer Memory as a Differentiable Search Index,"" https://arxiv.org/abs/2202.06991, Oct. 21, 2022, pp. 1-14.".
Yujing Wang, et al., "A Neural Corpus Indexer for Document Retrieval," https://arxiv.org/abs/2206.02743, Feb. 12, 2023, pp. 1-19.
"Bernd Bohnet, et al., ""Attributed Question Answering: Evaluation and Modeling for Attributed Large Language Models"" https://arxiv.org/abs/2212.08037, Feb. 10, 2023, pp. 1-15.".
Aleksandra Piktus, et al., "Retrieval-Augmented Generation for Knowledge-Intensive NLP Tasks," https://arxiv.org/abs/2005.11401, Apr. 12, 2021, pp. 1-19.
U.S. Appl. No. 18/344,742, filed Jun. 29, 2023, Saket Dingliwal, et al.
U.S. Appl. No. 18/759,561, filed Jun. 28, 2024, Suhas Benkatesh Murthy, et al.
U.S. Appl. No. 18/743,004, filed Jun. 13, 2024, Punit Ghodasara, et al.
U.S. Appl. No. 18/901,847, filed Sep. 30, 2024, Brandon Tyler Diamond, et al.
U.S. Appl. No. 18/757,247, filed Jun. 27, 2024, Roland Mesde, et al.
U.S. Appl. No. 18/432,837, filed Feb. 5, 2024, Rohit Malshe et al.

* cited by examiner

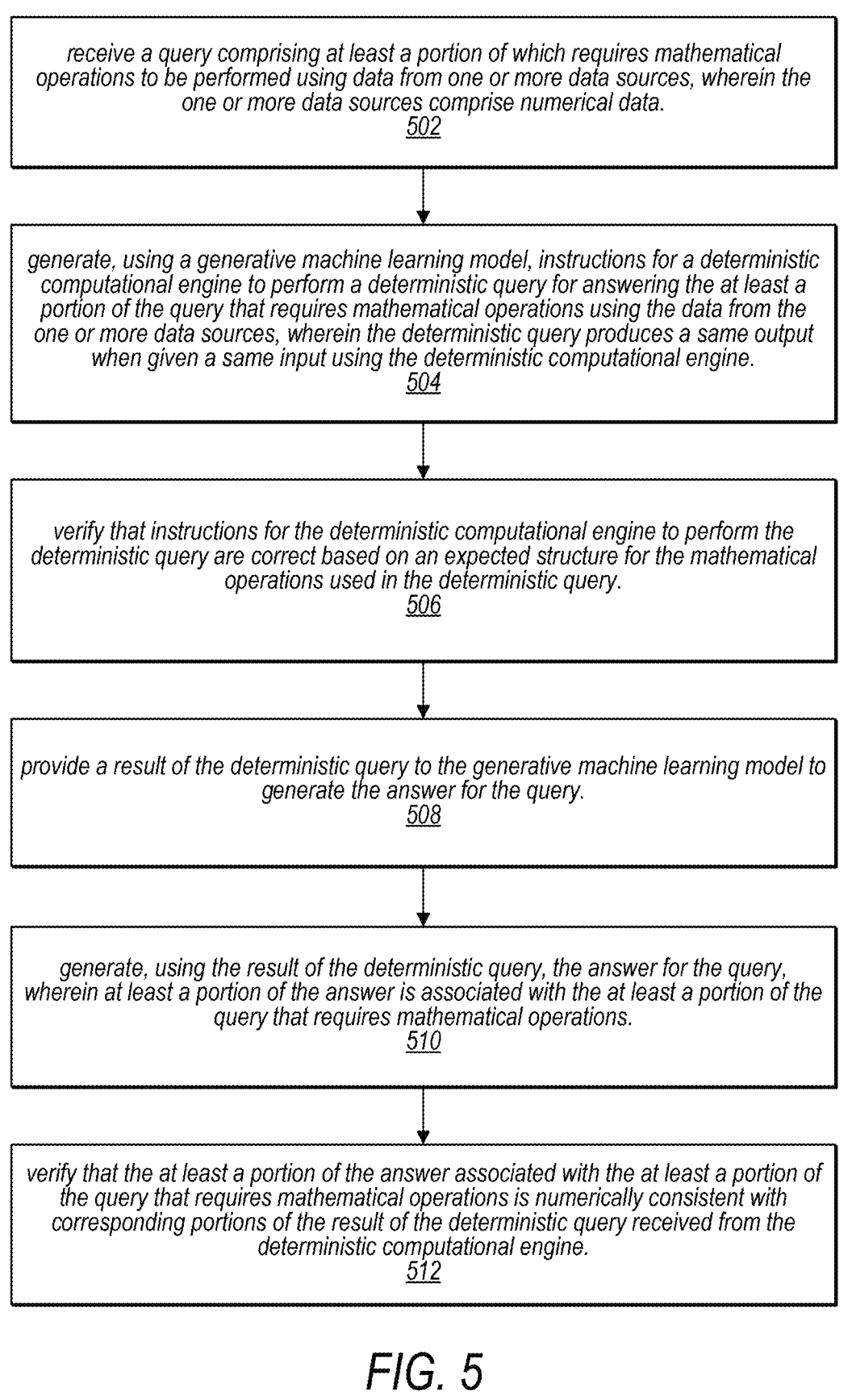

*receive a query comprising at least a portion of which requires mathematical operations to be performed using data from one or more data sources, wherein the one or more data sources comprise numerical data.*
502

*generate, using a generative machine learning model, instructions for a deterministic computational engine to perform a deterministic query for answering the at least a portion of the query that requires mathematical operations using the data from the one or more data sources, wherein the deterministic query produces a same output when given a same input using the deterministic computational engine.*
504

*verify that instructions for the deterministic computational engine to perform the deterministic query are correct based on an expected structure for the mathematical operations used in the deterministic query.*
506

*provide a result of the deterministic query to the generative machine learning model to generate the answer for the query.*
508

*generate, using the result of the deterministic query, the answer for the query, wherein at least a portion of the answer is associated with the at least a portion of the query that requires mathematical operations.*
510

*verify that the at least a portion of the answer associated with the at least a portion of the query that requires mathematical operations is numerically consistent with corresponding portions of the result of the deterministic query received from the deterministic computational engine.*
512

*FIG. 5*

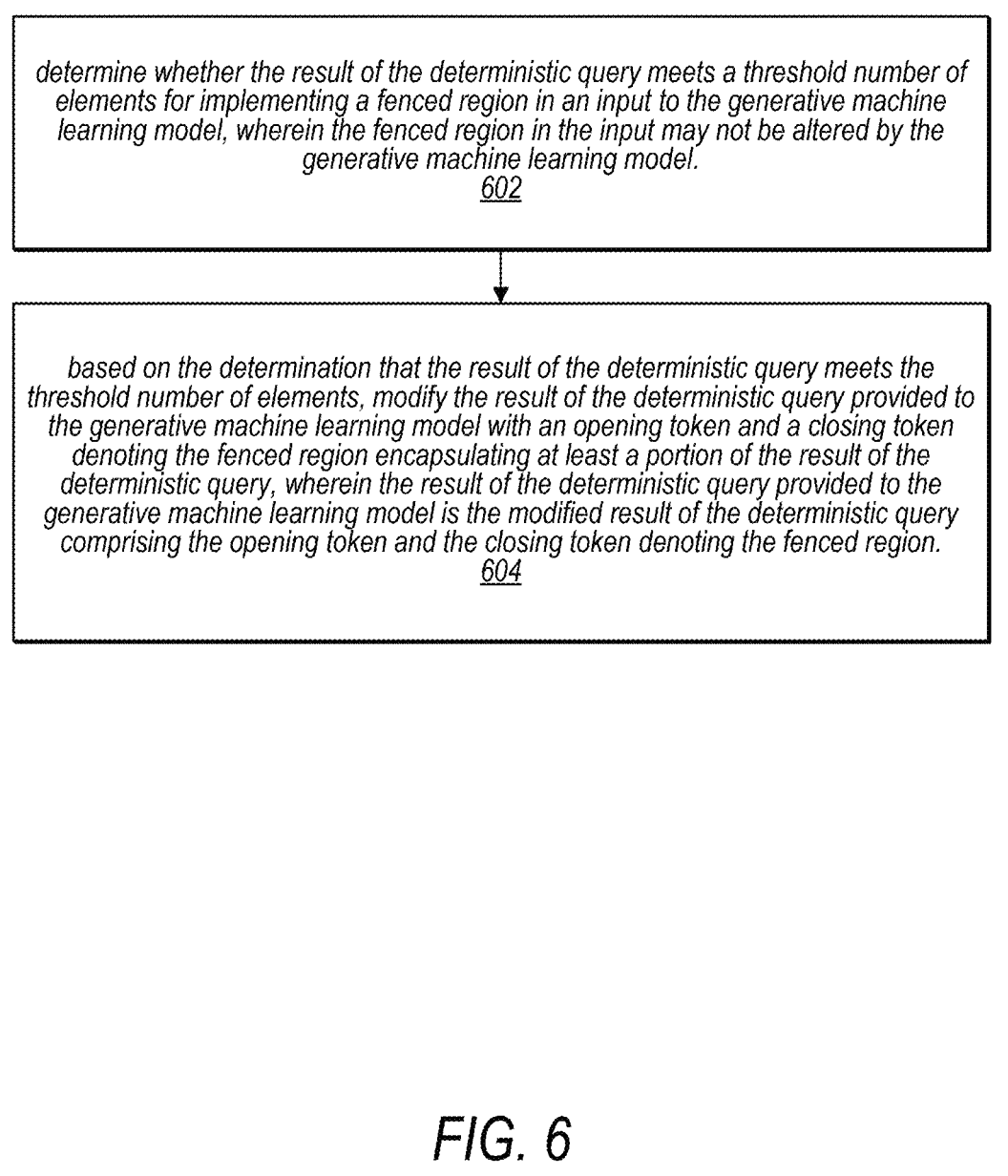

*determine whether the result of the deterministic query meets a threshold number of elements for implementing a fenced region in an input to the generative machine learning model, wherein the fenced region in the input may not be altered by the generative machine learning model.*
602

*based on the determination that the result of the deterministic query meets the threshold number of elements, modify the result of the deterministic query provided to the generative machine learning model with an opening token and a closing token denoting the fenced region encapsulating at least a portion of the result of the deterministic query, wherein the result of the deterministic query provided to the generative machine learning model is the modified result of the deterministic query comprising the opening token and the closing token denoting the fenced region.*
604

*FIG. 6*

NUMERICALLY ACCURATE GENERATIVE MACHINE LEARNING SYSTEM

BACKGROUND

Large language models (LLMs) are advanced machine learning models designed to understand and generate human language. LLMs may be employed across various scenarios requiring language comprehension. For instance, LLMs may be utilized in natural language processing (NLP) applications such as chatbots, content generation, and language translation, wherein LLMs may be required to interpret and produce text responses across diverse contexts. Given the broad spectrum of subject matters, LLMs are trained on large datasets encompassing different domains in order to ensure that the LLMs may be able to handle a wide variety of linguistic tasks, such as generating coherent and contextually appropriate answers to queries provided by a user. LLMs may also handle tasks involving numerical and mathematical data, wherein the LLMs may be trained on datasets that not only encompass language but also include numeric information and mathematical expressions. However, LLMs may struggle with processing numeric information due to likelihood of hallucinations occurring in numerical calculations.

BRIEF DESCRIPTION OF THE DRAWINGS

FIG. 5 illustrates a flowchart of operations performed by a generative machine learning system to generates a deterministic query for answering at least a portion of a query that requires mathematical operations and generates an answer for the query using result of the deterministic query, according to some embodiments.

FIG. 6 illustrates a flowchart of operations performed by a generative machine learning system to modify a result of the deterministic query provided to a generative machine learning model with an opening token and a closing token denoting a fenced region encapsulating at least a portion of the result of the deterministic query, according to some embodiments.

Figure 1A:
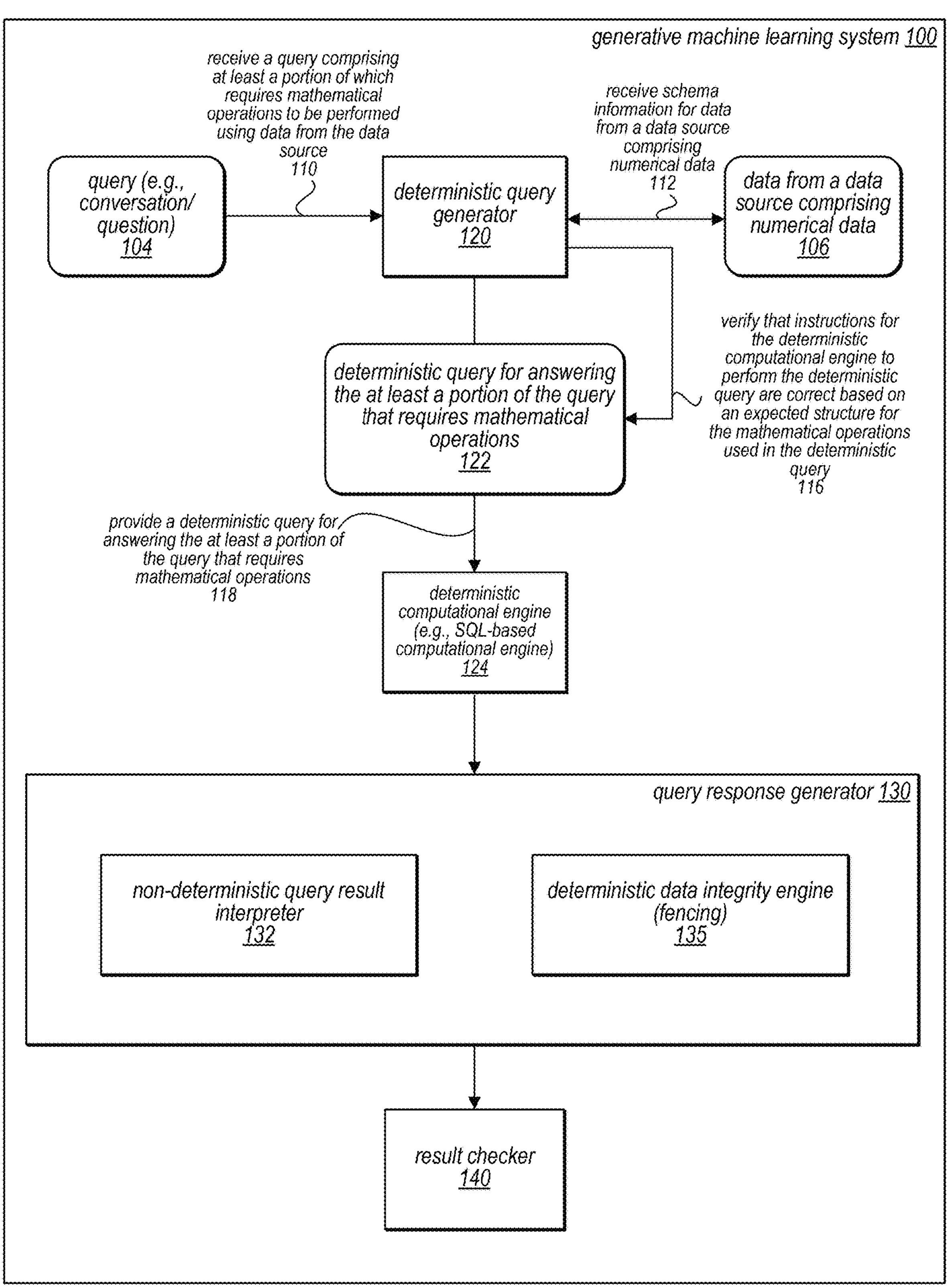
FIG. 1A is a block diagram illustrating a generative machine learning system, wherein a generative machine learning model (e.g., a deterministic query generator) generates a deterministic query for answering at least a portion of a query that requires mathematical operations, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

DETAILED DESCRIPTION OF EMBODIMENTS

The systems and methods described herein include techniques for implementing a generative machine learning system that generates instructions for a deterministic computational engine to perform a deterministic query for answering at least a portion of the query that requires mathematical operations, wherein a result of the deterministic query is used to generate a numerically correct answer for the query without hallucinations. The generative machine learning system may receive a query that includes at least a portion requiring mathematical operations to be performed using data from one or more data sources (e.g., datastores), wherein the data sources comprise numerical data. The generative machine learning system may use a generative machine learning model to generate instructions for a deterministic computational engine to perform a deterministic query, wherein the deterministic query answers the portion of the query requiring mathematical operations using data from the data sources and produces consistent outputs when provided the same inputs. The generative machine learning system may verify that the instructions for the deterministic computational engine are correct based on an expected structure for the mathematical operations used in the deterministic query. The generative machine learning system may perform the deterministic query using the deterministic computational engine and the data from the data sources. The generative machine learning system may provide the result of the deterministic query to the generative machine learning model, wherein the generative machine learning model may use the result to generate the answer for the query. The generative machine learning system may verify that the portion of the answer associated with the portion of the query requiring mathematical operations is numerically consistent with the corresponding portions of the result of the deterministic query.

At least one difficulty in using generative machine learning models, such as large language models (LLMs), may be "hallucinations" by the generative machine learning models-a phenomena referring to generation of factually incorrect information or errors. The issue of hallucinations may be particularly acute when a generative machine learning model is tasked with mathematical reasoning using numerical data. For example, hallucinations may be particularly problematic in using the generative machine learning model in domains that require high numerical and factual accuracy, such as financial or medical domains. Hallucinations may occur when the generative machine learning model generates outputs inconsistent with underlying data or logical constraints, leading to incorrect or misleading responses. For example, in cloud financial services, a user query such as "What were my expenses last month?" may demand precise numerical computation, as errors in such contexts may result in significant issues. Because generative machine learning models (e.g., LLMs) are influenced by probabilistic processes derived from training data and may not be deterministic, the generative machine learning models may be more prone to hallucinate numbers/mathematical operations. For example, LLMs may be trained on large datasets, learning statistical correlations between words, phrases, and numerical patterns. The LLMs may predict a continuation of a prompt rather than relying on explicit mathematical logic or factual correctness, and such probabilistic reasoning may lead to errors, especially in scenarios requiring precise numerical calculations.

In some embodiments, a generative machine learning system that generates instructions for a deterministic computational engine to perform a deterministic query for answering at least a portion of the query that requires mathematical operations and may ensure that a numerically correct answer for the query without hallucinations. Such generative machine learning system may address the challenge of hallucination pertaining to numerical data, by decoupling the generative machine learning models (e.g., LLMs) from direct mathematical computations and leveraging deterministic computational systems (e.g., structured query language (SQL)-based computational engines) to handle mathematical calculations. By generating deterministic queries that are validated for structure and correctness before execution by the computational engine, the generative machine learning system may ensure that numerical results are accurate. The generative machine learning system may mitigate hallucinations by restricting the generative machine learning models (e.g., LLMs) to generating and interpreting structured deterministic queries for a deterministic computational system (e.g., SQL-based computational engine) rather than directly processing numerical data.

In some embodiments, a generative machine learning system may evaluate whether the result of a deterministic query meets a threshold criteria for implementing a fenced region ("fencing") in the input to the generative machine learning model (e.g., meeting a threshold number of elements in the result of the deterministic query, or being an entity of factual importance such as dates, account-IDs, etc.). The fenced region may be defined by an opening token and a closing token and may not be altered by the generative machine learning model. In some embodiments, the generative machine learning system may, based on the determination that the threshold number of elements is met, modify the result of the deterministic query by encapsulating at least a portion of the result within the fenced region, denoted by the opening and closing tokens. In some embodiments, the modified result, including the opening and closing tokens defining the fenced region, may be provided as the input to the generative machine learning model to prevent hallucinations and/or unintended alterations.

In some embodiments, a generative machine learning system may determine a domain type associated with a query to tailor its processing approach. The generative machine learning system may utilize a library of domain-specific deterministic queries corresponding to the identified domain type to verify the correctness of instructions generated for the deterministic computational engine. The library may include predefined structures for mathematical operations that are specific to the given domain type, ensuring the deterministic query aligns with expected domain-specific requirements. In some embodiments, a generative machine learning system may identify, using the generative machine learning model, a portion of data from one or more data sources (e.g., datastores) that may be relevant to performing a query related to the data sources. The generative machine learning system may generate one or more application programming interface (API) calls to retrieve the identified portion of data from the data sources and access necessary information for query execution. The retrieved data may then be processed by the generative machine learning model to format the data according to a schema associated with the deterministic computational engine.

In some embodiments, a generative machine learning system may provide a failed result of a deterministic query by providing details regarding the failed result to the generative machine learning model for analysis. The generative machine learning model may generate, based on the failed result, a new instruction for the deterministic computational engine to perform another deterministic query. This subsequent deterministic query may address the deficiencies identified in the original query, ensuring that errors contributing to the failed result are corrected. In some embodiments, this iterative process may enhance the system's ability to resolve complex queries with greater accuracy and reliability.

FIG. 1A is a block diagram illustrating a generative machine learning system, wherein a generative machine learning model (e.g., a deterministic query generator) generates a deterministic query for answering at least a portion of a query that requires mathematical operations, according to some embodiments.

In some embodiments, a generative machine learning system 100 may comprise a deterministic query generator 120 a deterministic computational engine (e.g., SQL-based computational engine) 124 a query response generator 130, and a result checker 140. In some embodiments, the deterministic query generator 120 and the query response generator 130 may both be implemented as generative machine learning models, such as large language models (LLMs). In some embodiments, the deterministic query generator 120 and the query response generator 130 may be the same generative machine learning model or may be distinct generative machine learning models. The deterministic query generator 120 may receive 110 a query 104 comprising at least a portion of which requires mathematical operations to be performed using data from the datastore. In some embodiments, the deterministic query generator 120 may receive the query 106 and may generate a deterministic query for the deterministic computational engine to process the mathematical operations.

In some embodiments, the deterministic query generator 120 may receive 112 schema information regarding data 106 from a data source comprising numerical data. In some embodiments, a data source may be data obtained from one or more persistent or ephemeral datastores, such as databases, cloud storage systems, or temporary in-memory storage. Additionally, in some embodiments, the data source may include results derived from numerical operations performed using APIs. These operations may involve computations, transformations, or aggregations of raw data retrieved from the datastores or external systems. This schema information may describe structure, relationships, and format of the data 106, enabling the deterministic query generator 120 to understand how to formulate deterministic query instructions for the deterministic computational engine 124. For example, the deterministic query generator 120 (which may be implemented as a generative machine learning model such as an LLM), may determine an intent for the query and schema information of the data 106 from the data source comprising numerical data to generate a deterministic query capable of handling both data retrieval and mathematical operations (e.g., a SQL-query). For example, a user may submit a query such as "What is the average revenue from the top five customers over the last six months?" and a deterministic query generated for the query may include operations to filter the relevant data (e.g., identifying customers and their revenue records) and perform mathematical computations (e.g., calculating the average). The deterministic query generator 120 may produce a deterministic query that specifies the necessary operations and over relevant portion of the data from a data source comprising numerical data 106, wherein this query may be "deterministic" in that the query adheres to the principles of deterministic computation (e.g., produces a same output when given a same input).

In some embodiments, the schema information may include details such as table names, column types, and constraints, which the deterministic query generator 120 may use to ensure the generated query is syntactically correct and relevant to the mathematical operations required by the query. The deterministic query generator 120 may verify 116 that instructions for the deterministic computational engine to perform the deterministic query are correct based on an expected structure for the mathematical operations used in the deterministic query. In some embodiments, the deterministic query generator 120 may analyze the schema and metadata to confirm valid operations, comparing the generated query to domain-specific templates or rules, and applying guardrails to detect logical or structural errors, such as dividing by zero or using invalid column names. The generator may also perform static analysis to confirm the deterministic properties of the query, ensuring it produces consistent and reproducible outputs for identical inputs. In some embodiments, the deterministic query generator 120 may provide 118 a deterministic query for answering the at least a portion of the query that requires mathematical operations upon verification that the deterministic query is correct. In some embodiments, the expected structure for mathematical operations in the deterministic query 122 (e.g., SQL queries) may be used to verify the correctness of deterministic queries by enforcing logical and syntactical standards. For example, aggregate functions for SQL-based computational engines (such as SUM, AVG, or COUNT) may be validated to ensure they are applied only to numerical fields. In some embodiments, arithmetic operations may be inspected to confirm proper usage, such as avoiding division by zero or ensuring operations between consistent data types.

Figure 1B:
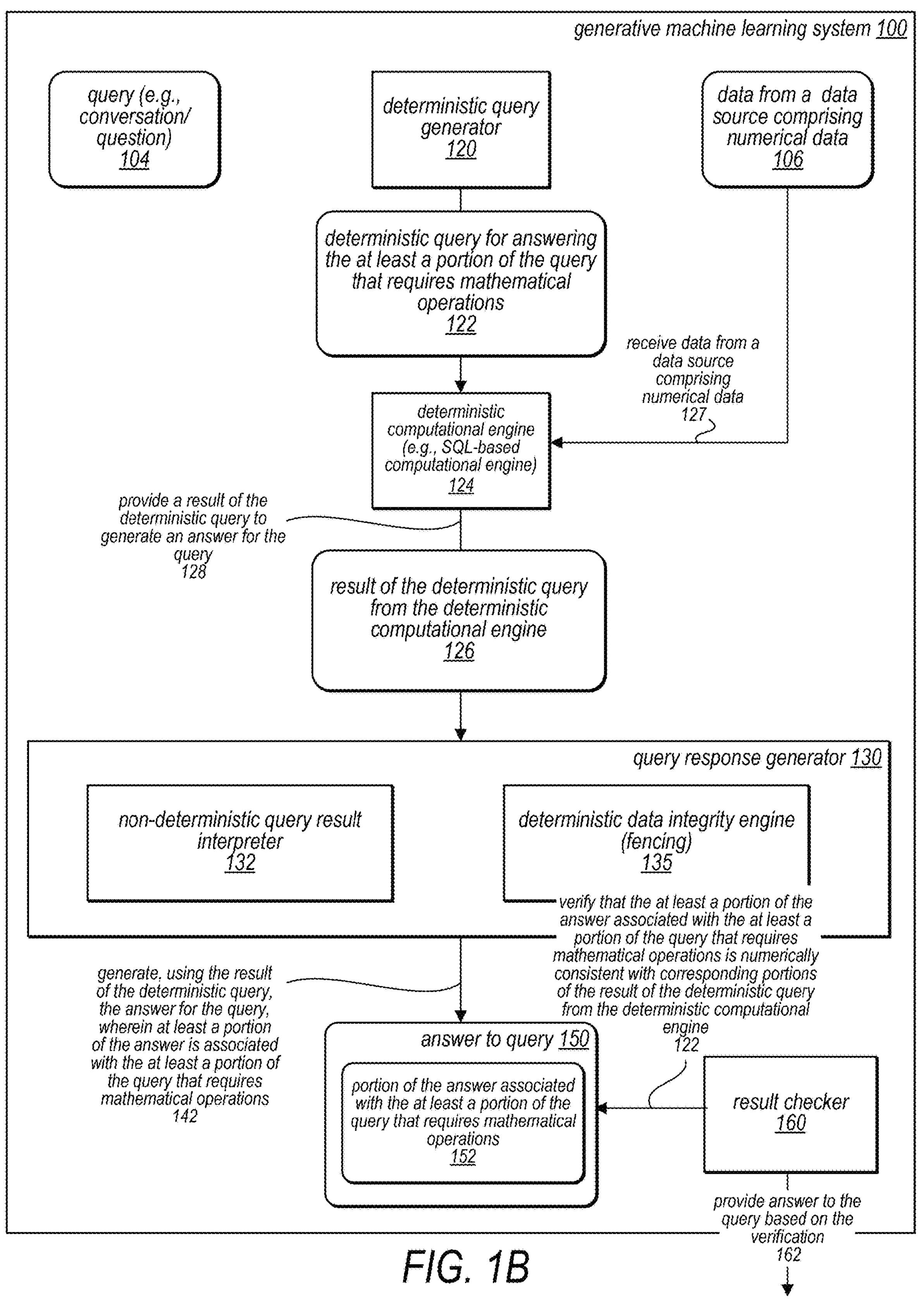
FIG. 1B is a block diagram illustrating a generative machine learning system, wherein a deterministic computation engine performs a deterministic query and a generative machine learning model (e.g., a query response generator) generates an answer for a query using result of the deterministic query, according to some embodiments.

FIG. 1B is a block diagram illustrating a generative machine learning system, wherein a deterministic computation engine performs a deterministic query and a generative machine learning model (e.g., a query response generator) generates an answer for a query using result of the deterministic query, according to some embodiments.

In some embodiments, the deterministic computational engine 124, such as an SQL-based computational engine, may execute deterministic queries by leveraging its capability to process structured data and perform mathematical operations with high precision and consistency. The deterministic computational engine 124 may receive a deterministic query, which includes instructions for retrieving and manipulating data stored in a data source comprising numerical data. In some embodiments, this data source may include schema information detailing the structure, types, and relationships of the data, such as table names, column types, and constraints. The deterministic computational engine 124 may utilize this schema information to parse and validate the query, ensuring it aligns with the data structure and adheres to deterministic computational principles. The deterministic computational engine 124 may then retrieve the required data from the data source and execute the mathematical operations specified in the query, such as aggregations, filtering, and arithmetic calculations, to produce the results 126 of the deterministic query.

In some embodiments, the query response generator 130 may generate 142 an answer 150 for the query using the result 126 of the deterministic query, wherein at least a portion of the answer is associated with the at least a portion of the query that requires mathematical operations. The query response generator 130 may analyze these results and synthesize a response that aligns with an original query 104. For example, if the deterministic query involved calculating the average revenue of top customers, the query response generator 130 may format and present the result as a user understandable answer, incorporating contextual explanations as needed. In some embodiments, the query response generator 130 may also consider the broader intent of the query and provide responses that integrate numerical results with explanatory text or summaries and may enhance the answer 150 to the query.

In some embodiments, a results checker 160, which may be implemented as a deterministic checker, may verify 172 that the portion of the answer associated with mathematical operations (e.g., the portion 152 of the answer associated with the at least a portion of the query that requires mathematical operations) is consistent with the corresponding portions of the results from the deterministic computational engine 124. The results checker 160 may employ techniques such as regular expression matching to validate the integrity of the answer. For example, the results checker 160 may extract the numerical portion of the query answer and compare it against the outputs of the deterministic computational engine to ensure they match precisely. In some embodiments, the results checker 160 may also analyze the logical consistency of the answer by verifying that the mathematical operations performed by the deterministic computational engine are accurately reflected in the final response. In some embodiments, the results checker 160 may ensure numerical consistency, guarding against errors or discrepancies in the portion of the answer associated with mathematical operations. In some embodiments, the results checker 160 may provide 162 an answer to the query based on the verification.

In some embodiments, a query response generator 130 may comprise different interpreters—a non-deterministic query result interpreter 132, and a deterministic data integrity engine (fencing) 135. In some embodiments, each interpreter may be designed to handle specific scenarios. In some embodiments, the query response generator 130 may analyze a result 126 of the deterministic query from the deterministic computational engine and dynamically determine which interpreter to utilize based on predefined criteria or rules.

In some embodiments, the non-deterministic query result interpreter 132 may be chosen when the results 126 from the deterministic computational engine does not require additional constraints to prevent the numerical results from the deterministic query from being modified by the query response generator (e.g., when number of elements in the result 126 of the deterministic query is below a threshold). For example, the number of elements in the result 126 may correlate to the likelihood of the query response generator 130 to hallucinate or modify the results 126, leading to numerical discrepancy. In some embodiments, despite the query response generator 130 not being directly tasked with performing the mathematical operations, the response generator 130 being a generative machine learning model may regardless incorrectly modify the portions of the result 126 of the deterministic query. For example, the query response generator 130 may present only 6 datapoints out of 10 datapoints that were requested in the query 104 and obtained using a SQL query. However, the query response generator 130, when the result 126 of the deterministic query is below a certain threshold number of elements (e.g., below 4) may not drop datapoints and present all datapoints (e.g., present all 3 datapoints out of 3 datapoints). When the query response generator 130 determines that no "fencing" or additional constraints are needed as an additional check, the non-deterministic query result interpreter 132 may be used (e.g., when a threshold number of elements correlated to likelihood of such errors or hallucinations is not met). In some embodiments, the deterministic data integrity engine (fencing) 135 may be utilized when additional verification or fencing mechanisms are necessary to ensure the correctness of the results. The deterministic data integrity engine (fencing) 135 may be employed in scenarios where the deterministic computational engine processes queries that require stricter validation. The fencing of the results 126 of the deterministic query is further discussed in FIG. 3.

Figure 2A:
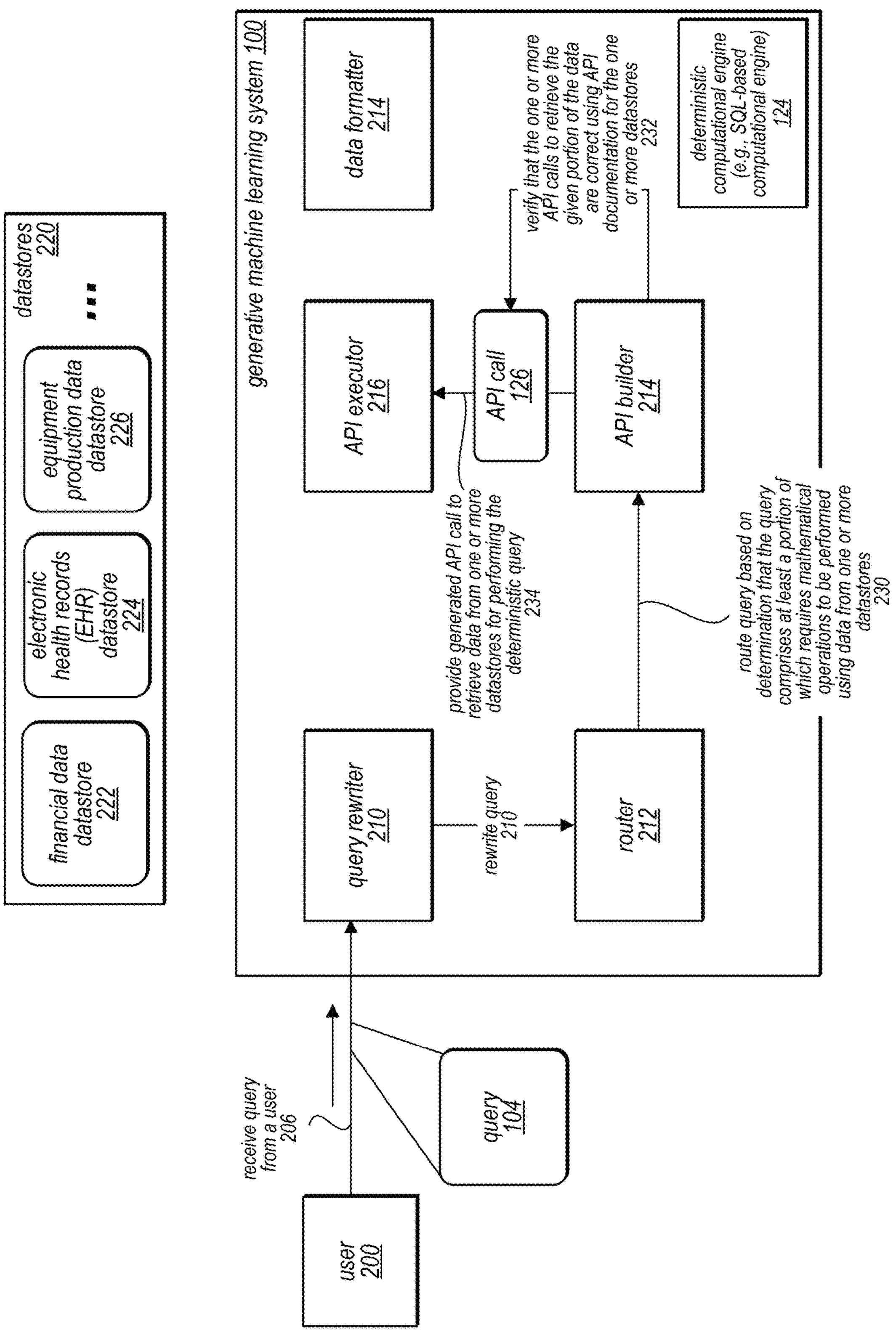
FIG. 2A illustrates a more detailed view of a generative machine learning system that generates an application programming interface (API) call for retrieving data from one or more datastores for performing a deterministic query, according to some embodiments.

FIG. 2A illustrates a more detailed view of a generative machine learning system that generates an application programming interface (API) call for retrieving data from one or more datastores for performing a deterministic query, according to some embodiments.

In some embodiments, a generative machine learning system 100 may comprise a query rewriter 210, a router 212, an API builder 214, an API executor 216, a data formatter 218, and a deterministic computation engine 124. In some embodiments, one or more of the query rewriter 210, the router 212, the API builder 214, the API executor 216, and the data formatter 218 may both be implemented as generative machine learning models, such as large language models (LLMs), wherein the components may be implemented as the same generative machine learning model or may be implemented as distinct generative machine learning models. In some embodiments, a query rewriter 210 may receive from a user 200 a query 104. The query 104 may be a question for a generative machine learning system 100 to answer. User 200 may provide queries via text input through a web interface, mobile application, command-line interface, etc. wherein the user 200 is able to type out their queries directly. Alternatively, the user 200 may employ audio input, speaking a query aloud through devices equipped with speech recognition capabilities. In some embodiments the query rewriter 210 may receive 206 the query 104 from the user. For example, the user 200 may provide a query indicating: "What are the top five average monthly revenues from the past year?" The query rewriter 210 may interpret semantic intent and structure of the query 140. In some embodiments, the query rewriter 210 may rewrite 211 the query (e.g., expanding on the terms used to better generate a deterministic query, such as rewriting "past year" to "past twelve months"). In some embodiments, the query may be a multi-modal query comprising multiple types of inputs (e.g., video and text, image and audio, etc.)

In some embodiments, a router 212 may route 230 the query from the user by analyzing its structure and content to determine whether it comprises at least a portion requiring mathematical operations to be performed using data from one or more datastores. The router 212 may parse the query and detect keywords, phrases, or structures indicative of computational needs, such as requests for averages, sums, or aggregations. Upon identifying such portions, the router 212 may determine that the query requires a separate deterministic query to process these operations and route the query to a deterministic query generator for further handling. This routing process may ensure that queries involving mathematical computations are directed to components capable of handling them deterministically, maintaining accuracy and consistency.

In some embodiments, the API builder 214 may generate an API call 256 to retrieve the relevant data from a datastore comprising numerical data by constructing a request using matching protocols for the datastore. The API builder 214 may analyze the datastore from which to obtain required data and translate a request for required data into a structured API call matching protocol specifications of the target datastore. For example, if the datastore provides a RESTful API, the API builder 214 may generate an HTTP request specifying the endpoint, query parameters, and necessary headers, such as authentication tokens or content types. The API call 256 may include filters, constraints, and data field specifications to ensure that only the required portion of the data is retrieved. In some embodiments, the API builder 214 may use templates or predefined rules. In some embodiments, the datastores 220 may comprise a range of specialized repositories tailored to distinct domains. For example, the datastores 220 may include a financial data datastore 222, an electronic health records (EHR) datastore 224, and an equipment production data datastore 226. The financial data datastore 222 may store numerical data related to transactions, revenues, or financial metrics, while the EHR datastore 224 may contain medical data, such as patient health records, laboratory results, or treatment histories. The equipment production data datastore 226 may house data about manufacturing processes, production metrics, or equipment performance, providing numerical insights into industrial operations. In some embodiments, the diverse datastores may comprise numerical data.

In some embodiments, the API builder 214 may verify that the one or more API calls to retrieve the required portion of the data are correct by utilizing API documentation for the datastores, such as the financial data datastore 222. In some embodiments, the verification process may involve cross-referencing the API call parameters with the specifications and constraints outlined in the documentation, such as permissible parameters. In some embodiments, the API builder 214 may also validate the API calls by performing static checks, such as ensuring that the requested fields exist in the datastore schema or that the parameters conform to the API rules. In some embodiments, the API builder 214 may provide 234 the generated API call to the API executor 216 to retrieve data from one or more datastores for performing the deterministic query.

Figure 2B:
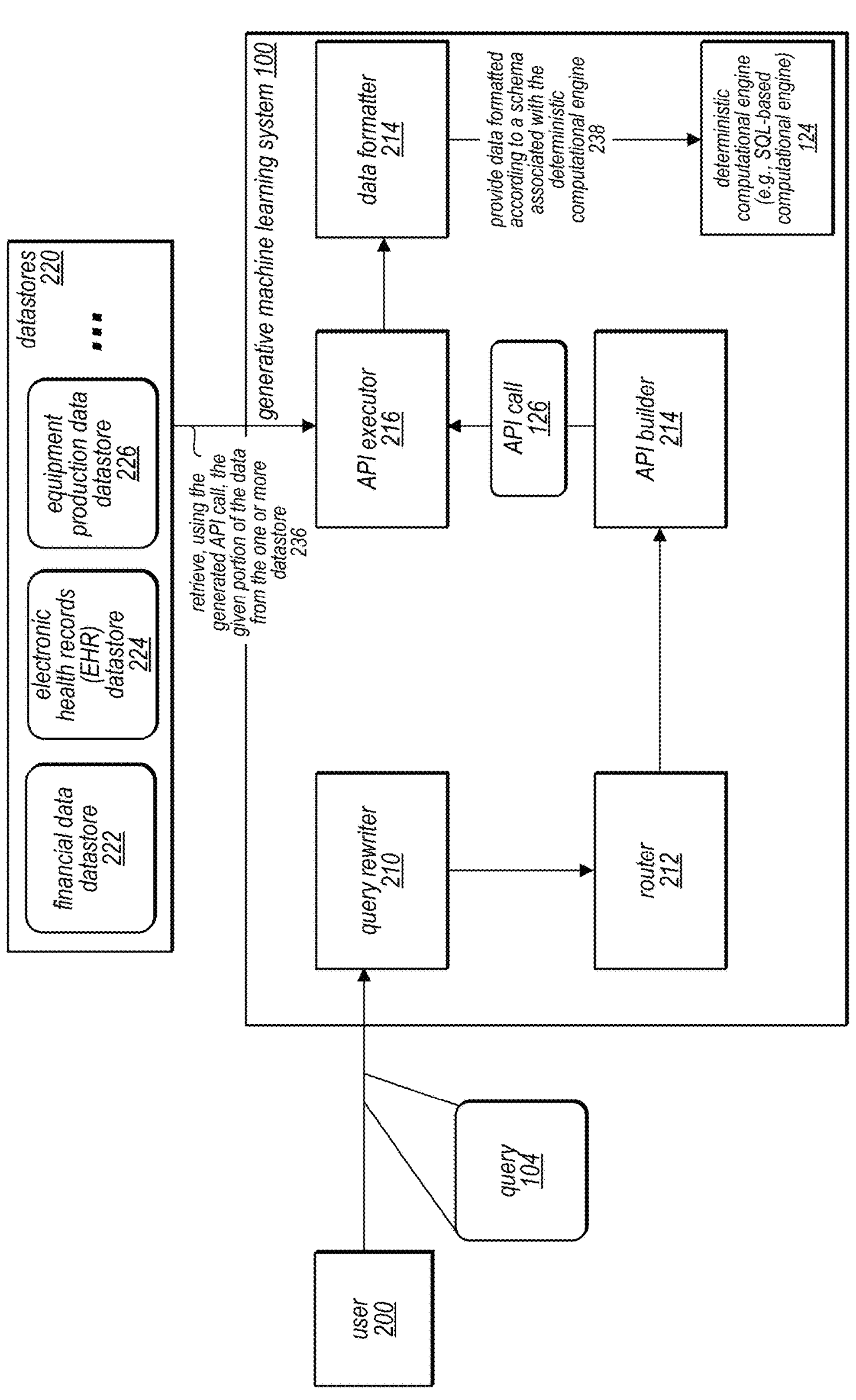
FIG. 2B illustrates a more detailed view of a generative machine learning system that retrieves and formats data from one or more datastores for performing a deterministic query using a generated application programming interface (API) call, according to some embodiments.

FIG. 2B illustrates a more detailed view of a generative machine learning system that retrieves and formats data from one or more datastores for performing a deterministic query using a generated application programming interface (API) call, according to some embodiments.

In some embodiments, the API builder 214 may retrieve 236 data from one or more datastores 220 by executing the generated API call 256. The API builder 214 may transmit the API call to the appropriate endpoint(s) of the datastore(s), adhering to the protocol requirements, such as REST, or other supported communication frameworks. Upon receiving the API call, the datastore(s) may process the request, filter the data based on the query parameters, and return the requested information in a response format, such as JSON or XML. The API builder 214 may handle the response, ensuring that the data is received correctly and corresponds to the fields, filters, and constraints specified in the API call. In some embodiments, the API builder 214 may also handle errors or exceptions, such as retrying the call if the initial attempt fails or logging issues for further resolution. In some embodiments, the data formatter 218 may format the retrieved data according to a schema associated with the deterministic computational engine 238. This formatting process may involve transforming the raw data into a structured format that the deterministic computational engine can readily process. For example, if the deterministic computational engine requires data in a tabular format with specific column names, types, or constraints, the data formatter 218 may map the fields from the API response to the expected schema. In some embodiments, this transformation may include renaming fields, converting data types (e.g., from strings to integers), or normalizing the data to ensure consistency with the computational engine's requirements. Additionally, the data formatter 218 may validate the formatted data against the schema to detect and correct any mismatches or anomalies, such as missing fields or unexpected data types. In some embodiments, the data formatter 218 may provide 238 the formatted according to a schema associated with the deterministic computational engine.

Figure 3:
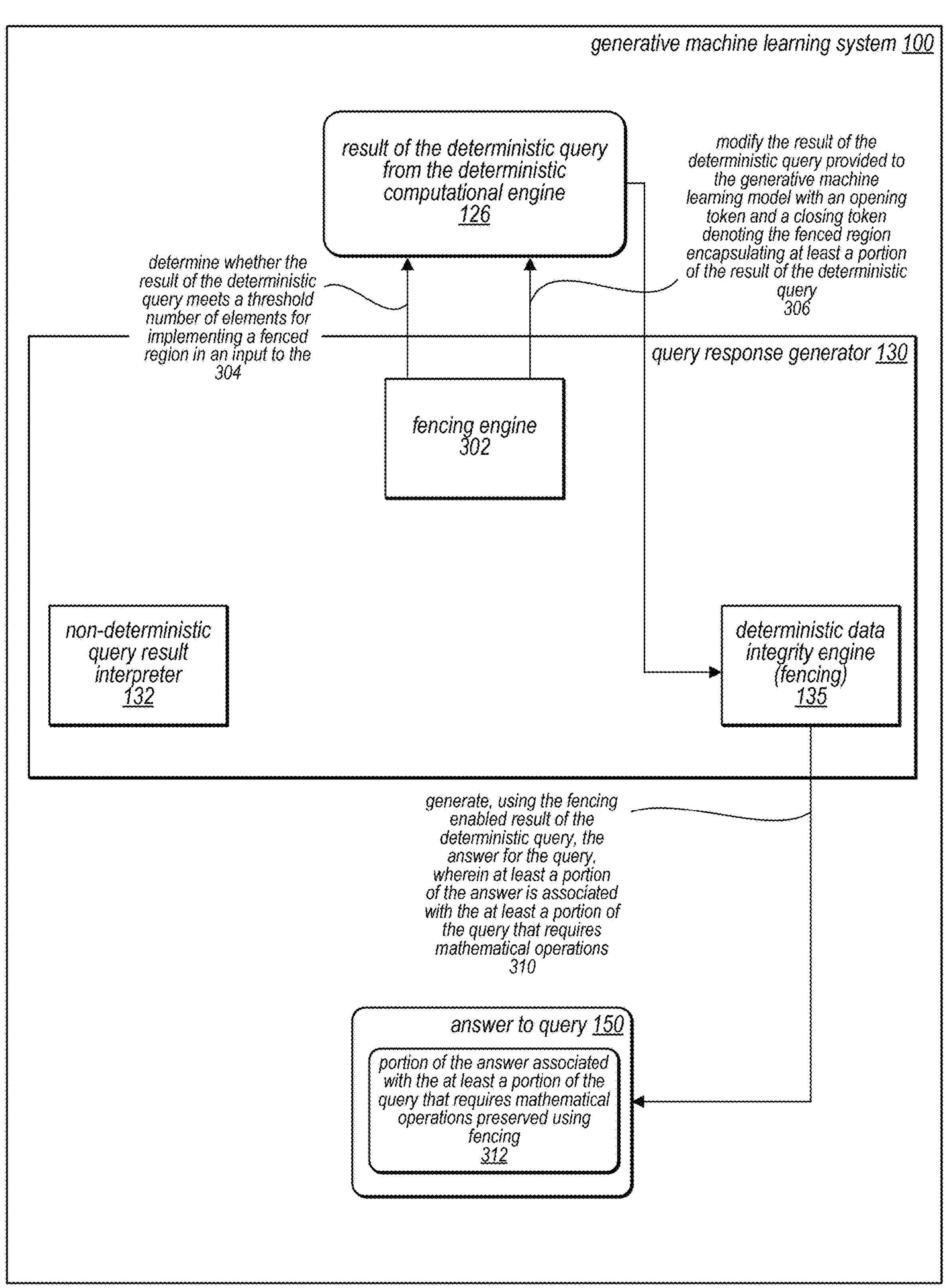
FIG. 3 illustrates a more detailed view of a generative machine learning system that modifies a result of the deterministic query provided to a generative machine learning model with an opening token and a closing token denoting a fenced region encapsulating at least a portion of the result of the deterministic query, according to some embodiments.

FIG. 3 illustrates a more detailed view of a generative machine learning system that modifies a result of the deterministic query provided to a generative machine learning model with an opening token and a closing token denoting a fenced region encapsulating at least a portion of the result of the deterministic query, according to some embodiments.

In some embodiments, a fencing engine 302 of the query response generator 130, which may be implemented as a generative machine learning model (e.g., an LLM), may determine 304 whether the result of the deterministic query meets a threshold number of elements for implementing a fenced region. In some embodiments, such determination may involve analyzing the structure and size of the deterministic query result and comparing it against a predefined threshold. For example, if the result includes a table of numerical data or a sequence of values, the fencing engine 302 may count the elements and assess whether they exceed the threshold. In some embodiments, the fencing engine 302 may also evaluate additional factors, such as the complexity or sensitivity of the data, to decide whether fencing is necessary. In some embodiments, the fencing engine 302 of the query response generator 130 may use other criteria to determine whether additional check to prevent the query response generator 130 from modifying portion of the result 126 of the deterministic query incorporated into an answer to the query 150. For example, in some embodiments, a check may be performed to determine whether the result 126 pertains to a given domain wherein precision and accuracy are indicated as important (e.g., financial domain, medical domain, or regulatory domain). In some embodiments, the fencing engine 302 may modify 306 the result 126 of the deterministic query with an opening token and a closing token denoting the fenced region encapsulating at least a portion of the result of the deterministic query. In some embodiments, these fencing tokens may serve as delimiters that explicitly mark the boundaries of the fenced region, ensuring that this portion of the result is treated with special handling. For example, the fencing engine 302 may prepend an opening token, such as '<fence>', and append a closing token, such as '</fence>', around the relevant data. The fencing mechanism may indicate to the query response generator 130 (which may be a generative machine learning model) that the encapsulated data is authoritative and should be preserved without modification or re-interpretation. In some embodiments, the fenced region may include numerical results or structured outputs critical to the answer 150 to the query.

In some embodiments, the deterministic data integrity engine (fencing) 135 of the query response generator 130 may utilize the fencing-enabled result of the deterministic query to generate 310 an answer for the query, wherein at least a portion of the answer is associated with the at least a portion of the query that requires mathematical operations. Such a process may involve integrating the fenced region with additional explanatory or contextual information generated by the query response generator. In some embodiments, the interpreter may respect the fenced region, ensuring that the numerical results or deterministic outputs within the fenced region are incorporated into the final answer without alteration. For example, if the fenced region includes a computed average or a filtered dataset, the deterministic data integrity engine (fencing) 135 may present this data as part of the answer 150 without modification. For example, the fencing mechanism may ensure that a portion 312 of the answer associated with the at least a portion of the query requiring mathematical operations is preserved from modification via fencing. In some embodiments, the query response generator 130 may recognize the fenced region as immutable, refraining from generating or altering content within it. This preservation mechanism may prevent errors or inconsistencies that may arise if the generative model were to re-interpret or modify the deterministic outputs. By safeguarding the integrity of the fenced region, the system may deliver an answer to the query 150 that faithfully reflects the results of the deterministic query, ensuring reliability and user trust in the response.

Figure 4:
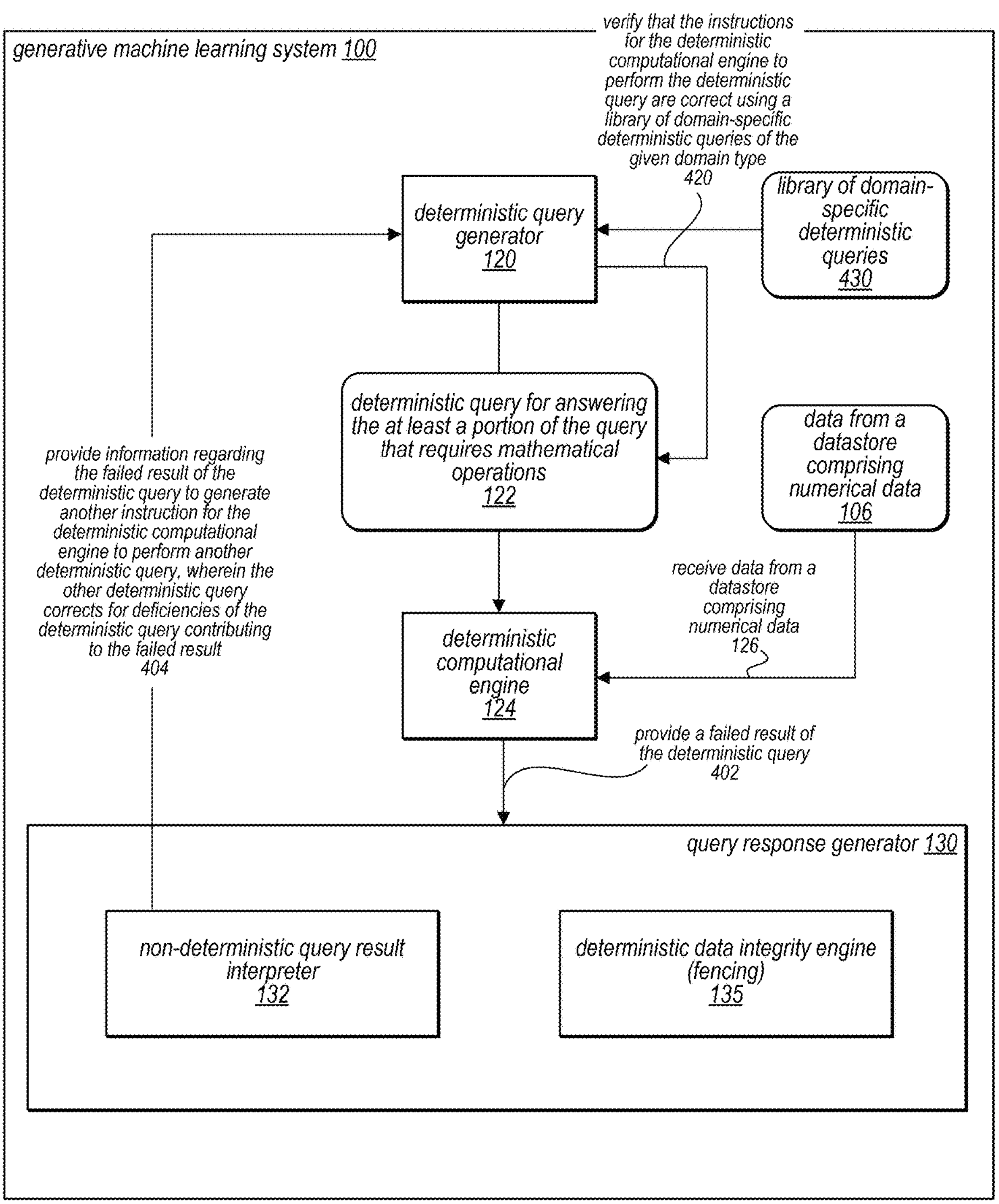
FIG. 4 illustrates a more detailed view of a generative machine learning system that verifies that instructions for the deterministic computational engine to perform a deterministic query are correct using a library of domain-specific deterministic queries of a given domain type, according to some embodiments.

FIG. 4 illustrates a more detailed view of a generative machine learning system that verifies that instructions for the deterministic computational engine to perform a deterministic query are correct using a library of domain-specific deterministic queries of a given domain type, according to some embodiments.

In some embodiments, the deterministic computational engine 124 may provide 402 a failed result of the deterministic query to a query response generator 130 when it encounters errors or deficiencies during query execution. These failures may arise due to issues such as incorrect query syntax, mismatched schema references, or logical inconsistencies, such as dividing by zero or applying unsupported operations. Upon detecting such errors, the deterministic computational engine 124 may return a failed result, which may include error codes, diagnostic messages, or partial outputs to inform the query response generator 130 of the nature of the failure. The failed result may serve as a signal for subsequent corrective actions to resolve the issue. In some embodiments, a non-deterministic query result interpreter 132 of the query response generator 130 may analyze the failed result and provide information regarding the failure to the deterministic query generator 120. In some embodiments, the non-deterministic query result interpreter 132 may be a generative machine learning model that extracts insights from error messages, diagnostic details, or partial outputs included in the failed result to identify the specific deficiencies that contributed to the failure. For example, if the error indicates an invalid column name or a missing data field, the interpreter may relay this information to the deterministic query generator 120. In some embodiments, the non-deterministic query result interpreter 132 may provide 404 information regarding the failed result of the deterministic query to generate another instruction for the deterministic computational engine to perform another deterministic query, wherein the other deterministic query corrects for deficiencies of the deterministic query contributing to the failed result. In some embodiments, the other deterministic query may address the identified deficiencies, such as correcting field references, modifying query parameters, or adjusting the query logic.

In some embodiments, the deterministic query generator 120 may verify that the instructions for the deterministic computational engine 124 to perform the deterministic query are correct by leveraging a library of domain-specific deterministic queries 430. The library of domain-specific deterministic queries 430 may comprise a collection of pre-validated queries tailored to a specific domain of the data, such as finance, healthcare, or manufacturing. The domain-specific queries in this library may adhere to domain-specific standards and/or rules. In some embodiments, the domain-specific queries may be used to determine whether a deterministic query is syntactically and logically correct for the given domain type. For example, the library for a financial domain may include queries for calculating revenue, performing risk assessments, or generating financial summaries, while a healthcare domain library may include queries for processing patient records, lab results, or treatment outcomes. In some embodiments, the deterministic query generator 120 may verify 420 that the instructions for the deterministic computational engine to perform the deterministic query are correct using a library of domain-specific deterministic queries of the given domain type. For example, the deterministic query generator 120 may compare the newly generated query against templates or examples in the library of domain-specific deterministic queries 430 to validate its structure and logic. In some embodiments, the verification process may include validating that the deterministic query (e.g., SQL query) adheres to domain constraints, such as using appropriate field names, data types, and operations relevant to the specific domain. In some embodiments, by cross-referencing with the library, the deterministic query generator 120 may identify and correct potential errors in the deterministic query.

FIG. 5 illustrates a flowchart of operations performed by a generative machine learning system to generates a deterministic query for answering at least a portion of a query that requires mathematical operations and generates an answer for the query using result of the deterministic query, according to some embodiments.

At block 502, a query comprising at least a portion requiring mathematical operations to be performed using data from one or more data sources, wherein the one or more data sources comprise numerical data, may be received. In some embodiments, the one or more data sources may be associated with specific API protocols as further discussed in FIG. 2A.

At block 504, instructions for a deterministic computational engine to perform a deterministic query for answering the portion of the query requiring mathematical operations using the data from the one or more data sources may be generated using a generative machine learning model. The deterministic query may produce the same output when given the same input using the deterministic computational engine. In some embodiments, a user may provide a query via a text input or an audio (e.g., voice) input, as further discussed in FIG. 2A. In some embodiments, the query may use a plurality of modes, such as a query that comprises a video and a question about the video.

At block 506, the instructions for the deterministic computational engine to perform the deterministic query may be verified as correct based on an expected structure for the mathematical operations used in the deterministic query. In some embodiments, a deterministic query generator may verify that instructions for a deterministic computational engine to perform the deterministic query are correct by leveraging a library of domain-specific deterministic queries, as further discussed in FIG. 4.

At block 508, a result of the deterministic query may be provided to the generative machine learning model to generate the answer for the query. In some embodiments, the generative machine learning model may be comprised of a single large language model (LLM) or may be comprised of multiple LLMs, as further discussed in FIG. 1B.

At block 510, the answer for the query may be generated using the result of the deterministic query, wherein at least a portion of the answer may be associated with the portion of the query requiring mathematical operations. In some embodiments, a generative machine learning model may provide information regarding a failed result of a deterministic query to generate another instruction for a deterministic computational engine to perform another deterministic query, wherein the other deterministic query may correct for deficiencies of the deterministic query contributing to the failed result, as further discussed in FIG. 4.

At block 512, it may be verified that the portion of the answer associated with the portion of the query requiring mathematical operations is numerically consistent with corresponding portions of the result of the deterministic query received from the deterministic computational engine. In some embodiments, a results checker of the generative machine learning system may employ techniques such as regular expression matching to validate the integrity of the answer, as further discussed in FIG. 1A.

FIG. 6 illustrates a flowchart of operations performed by a generative machine learning system to modify a result of the deterministic query provided to a generative machine learning model with an opening token and a closing token denoting a fenced region encapsulating at least a portion of the result of the deterministic query, according to some embodiments.

At block 602, it may be determined whether the result of the deterministic query meets a threshold number of elements for implementing a fenced region in an input to the generative machine learning model, wherein the fenced region in the input may not be altered by the generative machine learning model. In some embodiments, a fencing engine of a query response generator may use other criteria to determine whether fencing should be applied, as further discussed in FIG. 3.

At block 604, based on determining that the result of the deterministic query meets the threshold number of elements, the result of the deterministic query provided to the generative machine learning model may be modified with an opening token and a closing token denoting the fenced region encapsulating at least a portion of the result of the deterministic query. The modified result of the deterministic query, comprising the opening token and the closing token denoting the fenced region, may then be provided to the generative machine learning model. In some embodiments, fencing tokens may serve as delimiters that explicitly mark boundaries of the fenced region, as further discussed in in FIG. 3.

Example Computer System

Figure 7:
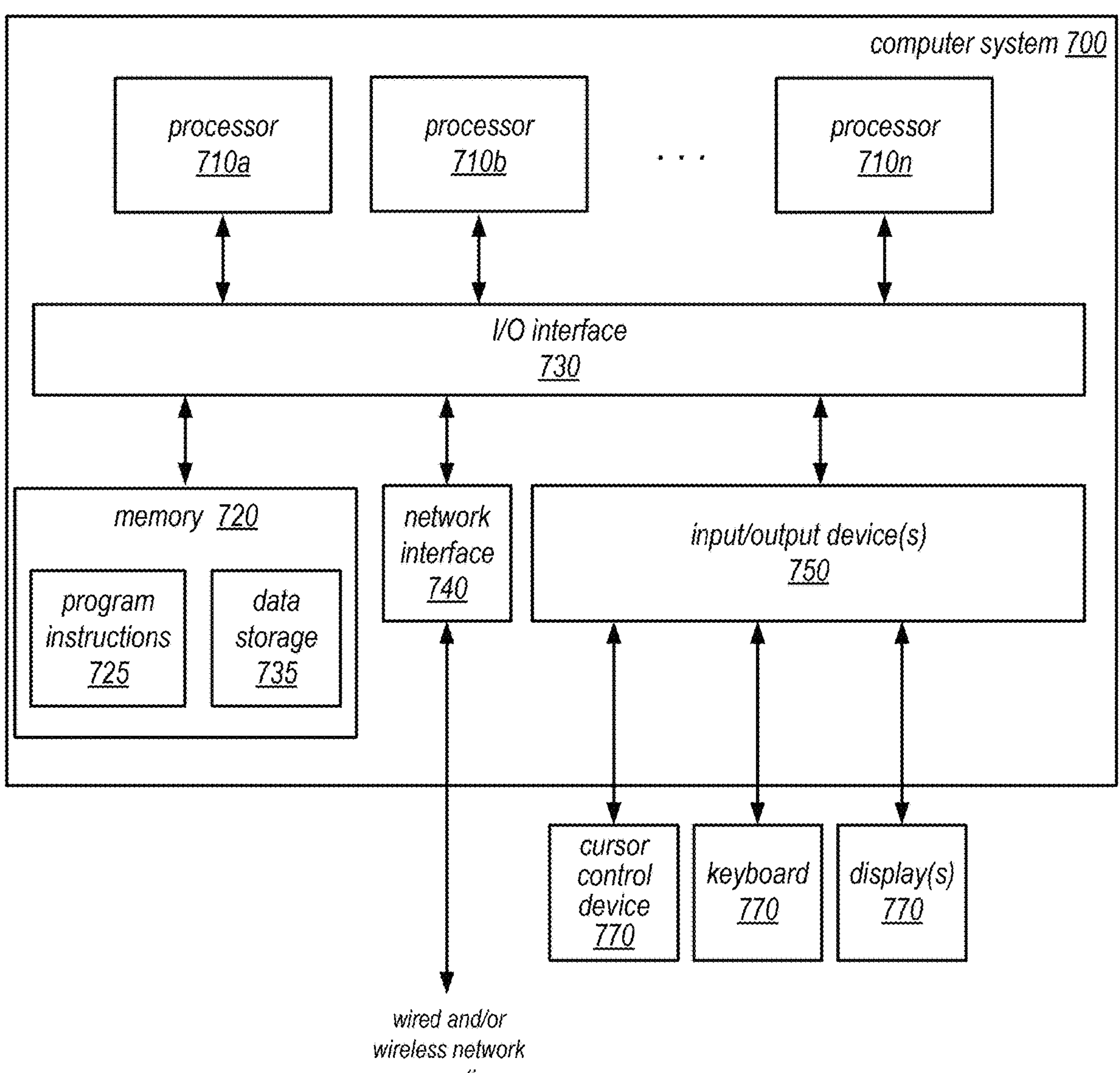
FIG. 7 illustrates a block diagram illustrating an example computer system that implements some, or all, of the techniques described herein, according to some embodiments.

Any of various computer systems may be configured to implement processes associated with a multimodal generative machine learning system or any other component of the above figures. For example, FIG. 7 illustrates a block diagram illustrating an example computer system that implements some, or all, of the techniques described herein, according to some embodiments. In various embodiments, any component of the above figures, FIGS. 1A-6, may each include one or more computer systems 700 such as that illustrated in FIG. 7.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or that provide a downloadable application, while in other embodiments servers may include more, fewer, or different elements than computer system 700.

In various embodiments, computing device 700 may be a uniprocessor system including one processor or a multiprocessor system including several processors 710*a*-710*n* (e.g., two, four, eight, or another suitable number). Processors 710*a*-710*n* may include any suitable processors capable of executing instructions. For example, in various embodiments, processors 710*a*-710*n* may be processors implementing any of a variety of instruction set formats (ISAs), such as the x77, PowerPC, SPARC, or MIPS ISAs, or any other suitable ISA. In some embodiments, processors 710*a*-710*n* may include specialized processors such as graphics processing units (GPUs), application specific integrated circuits (ASICs), etc. In multiprocessor systems, each of processors 710*a*-710*n* may commonly, but not necessarily, implement the same ISA.

System memory 720 may be configured to store program instructions and data accessible by processor(s) 710*a*-710*n*. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720 as code (e.g., program instructions) 725 and data storage 735.

In one embodiment, I/O interface 730 may be configured to coordinate I/O traffic between processors 710*a*-710*n*, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, I/O interface 730 may include support for devices attached via an automotive may bus, etc. In some embodiments, the function of I/O interface 730 may be split into two or more separate components, such as a north bridge and a south bridge, for example. Also, in some embodiments, some, or all of the functionality of I/O interface 730, such as an interface to system memory 720, may be incorporated directly into processors 710*a*-710*n*.

In some embodiments, the network interface 740 may be coupled to I/O interface 730, and one or more input/output devices 750, such as cursor control device 770, keyboard 770, and display(s) 770. In some cases, it is contemplated that embodiments may be implemented using a single instance of computer system 700, while in other embodiments multiple such computer systems, or multiple nodes making up computer system 700, may be configured to host different portions or instances program instructions as described above for various embodiments. For example, in one embodiment some elements of the program instructions may be implemented via one or more nodes of computer system 700 that are distinct from those nodes implementing other elements.

Network interface 740 may be configured to allow data to be exchanged between computing device 700 and other devices associated with a network or networks. In various embodiments, network interface 740 may support communication via any suitable wired or wireless general data networks, such as types of ethernet networks, cellular networks, Bluetooth networks, Wi-Fi networks, Ultra-wideband Networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (e.g., computer-accessible) medium configured to store program instructions and data as described above for implementing embodiments of the corresponding methods, systems, and apparatus. However, in other embodiments, program instructions and/or data may be received, sent, or stored upon different types of computer-readable media. Generally speaking, a computer-readable medium may include non-transitory storage media or memory media such as magnetic or optical media, e.g., disk or DVD/CD coupled to computing device 700 via I/O interface 730. One or more non-transitory computer-readable storage media may also include any volatile or non-volatile media such as RAM (e.g., SDRAM, DDR SDRAM, RDRAM, SRAM, etc.), ROM, etc., that may be included in some embodiments, of computing device 700 as system memory 720 or another type of memory. Further, a computer-readable medium may include transmission media or signals such as electrical, electromagnetic, or digital signals, conveyed via a communication medium such as a network and/or a wireless link, such as may be implemented via network interface 740. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device" and "ECU" as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of various services, databases, devices, and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The invention claimed is:

1. A system, comprising:

one or more computing devices configured to implement a generative machine learning system, configured to:

receive a question comprising at least a portion of which requires mathematical operations to be performed using data from one or more data sources, wherein the one or more data sources comprise numerical data;

generate, using a generative machine learning model, instructions for a deterministic computational engine to perform a deterministic query for answering the at least a portion of the question that requires mathematical operations using the data from the one or more data sources, wherein the deterministic query produces a same output when given a same input using the deterministic computational engine;

verify that instructions for the deterministic computational engine to perform the deterministic query are correct based on an expected structure for the mathematical operations used in the deterministic query;

perform, using the deterministic computational engine, the deterministic query using the data from the one or more data sources;

generate the answer for the question based on the question and the result of the deterministic query, wherein at least a portion of the answer is associated with the at least a portion of the question that requires mathematical operations;

verify that the at least a portion of the answer associated with the at least a portion of the question that requires mathematical operations is numerically consistent with corresponding portions of the result of the deterministic query received from the deterministic computational engine; and provide, in response to the question, the answer that has been verified.

2. The system of claim 1, wherein the one or more computing devices configured to implement the generative machine learning system is configured to:

determine whether the result of the deterministic query meets a threshold criteria for implementing a fenced region in an input to the generative machine learning model, wherein the fenced region in the input may not be altered by the generative machine learning model;

based on the determination that the result of the deterministic query meets the threshold criteria, modify the result of the deterministic query provided to the generative machine learning model with an opening token and a closing token denoting the fenced region encapsulating at least a portion of the result of the deterministic query; and wherein the result of the deterministic query provided to the generative machine learning model is the modified result of the deterministic query comprising the opening token and the closing token denoting the fenced region.

3. The system of claim 1, wherein the one or more computing devices configured to implement the generative machine learning system is configured to:

determine, using the generative machine learning model, that a given portion of the data from the one or more data sources are relevant to the performance of the question regarding the one or more data sources;

generate, using the generative machine learning model, one or more applicational programming interface (API) calls to retrieve the given portion of the data from the one or more data sources for performing the deterministic query; and retrieve, using the generated one or more API calls, the given portion of the data from the one or more data sources; and format, using the generative machine learning model, the retrieved given portion of the data according to a schema associated with the deterministic computational engine.

4. The system of claim 1, wherein the one or more computing devices configured to implement the generative machine learning system is configured to:

determine a given domain type associated with the question; and wherein the generative machine learning system is configured to verify that the instructions for the deterministic computational engine to perform the deterministic query are correct using a library of domain-specific deterministic queries of the given domain type, wherein the library comprises structures for mathematical operations for the given domain type.

5. The system of claim 1, wherein the one or more computing devices configured to implement the generative machine learning system is configured to:

provide, to the generative machine learning model, a failed result of the deterministic query to the generative machine learning model; and generate, based on the failed result of the deterministic query, another instruction for the deterministic computational engine to perform another deterministic query, wherein the other deterministic query corrects for deficiencies of the deterministic query contributing to the failed result.

6. The system of claim 1, wherein:

the deterministic computational engine is a structured query language (SQL)-based computational engine; and the deterministic query is a SQL query comprising SQL operations that are deterministically verifiable.

7. A method, comprising:

receiving a question comprising at least a portion of which requires mathematical operations to be performed using data from one or more data sources, wherein the one or more data sources comprise numerical data;

generating, using a generative machine learning model, instructions for a deterministic computational engine to perform a deterministic query for answering the at least a portion of the question that requires mathematical operations using the data from the one or more data sources, wherein the deterministic query produces a same output when given a same input using the deterministic computational engine;

verifying that instructions for the deterministic computational engine to perform the deterministic query are correct based on an expected structure for the mathematical operations used in the deterministic query;

performing, using the deterministic computational engine, the deterministic query using the data from the one or more data sources;

generating the answer for the question based on the question and the result of the deterministic query, wherein at least a portion of the answer is associated with the at least a portion of the query that requires mathematical operations;

verifying that the at least a portion of the answer associated with the at least a portion of the question that requires mathematical operations is numerically consistent with corresponding portions of the result of the deterministic query received from the deterministic computational engine; and providing, in response to the question, the answer that has been verified.

8. The method of claim 7, further comprising:

determining whether the result of the deterministic query meets a threshold criteria for implementing a fenced region in an input to the generative machine learning model, wherein the fenced region in the input may not be altered by the generative machine learning model;

based on the determination that the result of the deterministic query meets the threshold criteria, modifying the result of the deterministic query provided to the generative machine learning model with an opening token and a closing token denoting the fenced region encapsulating at least a portion of the result of the deterministic query; and wherein the result of the deterministic query provided to the generative machine learning model is the modified result of the deterministic query comprising the opening token and the closing token denoting the fenced region.

9. The method of claim 7, further comprising:

determining, using the generative machine learning model, that a given portion of the data from the one or more data sources are relevant to the performance of the question regarding the one or more data sources;

generating, using the generative machine learning model, one or more applicational programming interface (API) calls to retrieve the given portion of the data from the one or more data sources for performing the deterministic query; and retrieving, using the generated one or more API calls, the given portion of the data from the one or more data sources; and formatting, using the generative machine learning model, the retrieved given portion of the data according to a schema associated with the deterministic computational engine.

10. The method of claim 9, further comprising:

verifying, using the generative machine learning model, that the one or more API calls to retrieve the given portion of the data are correct using API documentation for the one or more data sources.

11. The method of claim 7, further comprising:

determining a given domain type associated with the question; and verifying that the instructions for the deterministic computational engine to perform the deterministic query are correct using a library of domain-specific deterministic queries of the given domain type, wherein the library comprises structures for mathematical operations for the given domain type.

12. The method of claim 7, further comprising:

providing, to the generative machine learning model, a failed result of the deterministic query to the generative machine learning model; and generating, based on the failed result of the deterministic query, another instruction for the deterministic computational engine to perform another deterministic query, wherein the other deterministic query corrects for deficiencies of the deterministic query contributing to the failed result.

13. The method of claim 7, wherein:

the deterministic computational engine is a structured query language (SQL)-based computational engine; and the deterministic query is a SQL query comprising SQL operations that are deterministically verifiable.

14. One or more non-transitory, computer-readable storage media, storing program instructions that when executed on or across one or more computing devices cause the one or more computing devices to implement:

receiving a question comprising at least a portion of which requires mathematical operations to be performed using data from one or more data sources, wherein the one or more data sources comprise numerical data;

generating, using a generative machine learning model, instructions for a deterministic computational engine to perform a deterministic query for answering the at least a portion of the question that requires mathematical operations using the data from the one or more data sources, wherein the deterministic query produces a same output when given a same input using the deterministic computational engine;

verifying that instructions for the deterministic computational engine to perform the deterministic query are correct based on an expected structure for the mathematical operations used in the deterministic query;

performing, using the deterministic computational engine, the deterministic query using the data from the one or more data sources;

generating the answer for the question based on the question and the result of the deterministic query, wherein at least a portion of the answer is associated with the at least a portion of the question that requires mathematical operations;

verifying that the at least a portion of the answer associated with the at least a portion of the question that requires mathematical operations is numerically consistent with corresponding portions of the result of the deterministic query received from the deterministic computational engine; and providing, in response to the question, the answer that has been verified.

15. The one or more non-transitory, computer-readable, storage media of claim 14, wherein the program instructions, when executed on or across one or more computing devices, cause the one or more computing devices to implement:

determining whether the result of the deterministic query meets a threshold criteria for implementing a fenced region in an input to the generative machine learning model, wherein the fenced region in the input may not be altered by the generative machine learning model;

based on the determination that the result of the deterministic query meets the threshold criteria, modifying the result of the deterministic query provided to the generative machine learning model with an opening token and a closing token denoting the fenced region encapsulating at least a portion of the result of the deterministic query; and wherein the result of the deterministic query provided to the generative machine learning model is the modified result of the deterministic query comprising the opening token and the closing token denoting the fenced region.

16. The one or more non-transitory, computer-readable, storage media of claim 14, wherein the program instructions, when executed on or across one or more computing devices, cause the one or more computing devices to implement:

determining, using the generative machine learning model, that a given portion of the data from the one or more data sources are relevant to the performance of the question regarding the one or more data sources;

generating, using the generative machine learning model, one or more applicational programming interface (API) calls to retrieve the given portion of the data from the one or more data sources for performing the deterministic query; and retrieving, using the generated one or more API calls, the given portion of the data from the one or more data sources; and formatting, using the generative machine learning model, the retrieved given portion of the data according to a schema associated with the deterministic computational engine.

17. The one or more non-transitory, computer-readable, storage media of claim 16, wherein the program instructions, when executed on or across one or more computing devices, cause the one or more computing devices to implement:

verifying, using the generative machine learning model, that the one or more API calls to retrieve the given portion of the data are correct using API documentation for the one or more data sources.

18. The one or more non-transitory, computer-readable, storage media of claim 14, wherein the program instructions, when executed on or across one or more computing devices, cause the one or more computing devices to implement:

determining a given domain type associated with the question; and verifying that the instructions for the deterministic computational engine to perform the deterministic query are correct using a library of domain-specific deterministic queries of the given domain type, wherein the library comprises structures for mathematical operations for the given domain type.

19. The one or more non-transitory, computer-readable, storage media of claim 14, wherein the program instructions, when executed on or across one or more computing devices, cause the one or more computing devices to implement:

providing, to the generative machine learning model, a failed result of the deterministic query to the generative machine learning model; and generating, based on the failed result of the deterministic query, another instruction for the deterministic computational engine to perform another deterministic query, wherein the other deterministic query corrects for deficiencies of the deterministic query contributing to the failed result.

20. The one or more non-transitory, computer-readable, storage media, storing the program instructions of claim 14, wherein:

the deterministic computational engine is a structured query language (SQL)-based computational engine; and the deterministic query is a SQL query comprising SQL operations that are deterministically verifiable.

* * * * *